United States Patent
Yoshida

Patent Number: 5,318,804
Date of Patent: Jun. 7, 1994

[54] EXTRUSION TYPE COATER AND COATING METHOD

[75] Inventor: Makoto Yoshida, Hino, Japan

[73] Assignee: Konica Corporation, Tokyo, Japan

[21] Appl. No.: 971,044

[22] Filed: Nov. 3, 1992

[30] Foreign Application Priority Data

Nov. 6, 1991 [JP] Japan .................. 3-289801

[51] Int. Cl.⁵ .................. B05D 3/12; B05D 1/26; B03C 3/18
[52] U.S. Cl. .................. 427/356; 427/358; 427/128; 118/409; 118/410
[58] Field of Search .................. 118/409, 410, 407; 427/356, 128, 358; 425/461

[56] References Cited

U.S. PATENT DOCUMENTS

| | | | |
|---|---|---|---|
| 2,681,294 | 6/1954 | Beguin | 430/523 |
| 4,445,458 | 5/1984 | O'Brien | 118/401 |
| 4,480,583 | 11/1984 | Tanaka et al. | 118/410 |

FOREIGN PATENT DOCUMENTS

| | | | |
|---|---|---|---|
| 3447510 | 7/1985 | Fed. Rep. of Germany | B05D 1/00 |
| 3907846 | 9/1989 | Fed. Rep. of Germany | B05C 11/02 |

Primary Examiner—Michael W. Ball
Assistant Examiner—Francis J. Lorin
Attorney, Agent, or Firm—Jordan B. Bierman

[57] ABSTRACT

In a coater for applying a liquid onto a surface of a moving object, the coater includes a front edge surface, a back edge surface and a slit, wherein the back edge surface has an entrance edge from which the coating liquid is introduced into a gap between the back edge surface and the surface of the object and an exit edge from which the extruded coating liquid leaves the gap with the movement of the object. The back edge surface further is arranged in relation to the object so as to satisfy following two formulas; $1.0 \text{ mm} \leq L \leq 30 \text{ mm}$ and $1.8 \leq h/h_0 \leq 3$ where L is a length of a contour of the back edge surface projected on the surface of the object between the entrance edge and the exit edge; $h$ is a gap distance at the entrance edge; and h is a gap distance at the exit edge.

8 Claims, 3 Drawing Sheets

EXTRUSION TYPE COATER AND COATING METHOD

BACKGROUND OF THE INVENTION

The present invention relates to an extrusion type coater and a coating method. More specifically, the invention relates to a coater and a coating method for coating thin film stably at a high speed when producing photographic materials or magnetic recording media, and so on.

Various coating methods such as roll coating, gravure coating, extrusion coating, slide bead coating, and curtain coating are generally known.

A photographic material is produced by applying undercoating liquid onto a supporter and then photographic emulsion on it and a magnetic recording medium is produced by applying magnetic coating liquid onto a supporter. The coating method often used for photographic materials is slide bead coating, extrusion coating, curtain coating, or roll coating and the coating method often used for magnetic recording media is reverse roll coating, gravure coating, or extrusion coating. Among them, the extrusion coating method is considered to be superior to the others because the coating film thickness is determined by the liquid flow rate, and no excessive coating liquid is returned, and a uniform coating film thickness is obtained regardless of the viscosity of coating liquid.

In the aforementioned manufacture of photographic materials or magnetic recording media, there are increasing demands for thin film coating so as to cope with high density or for high speed coating as far as possible so as to increase the productivity.

The prior arts of the extrusion coating method, which are mentioned, for example, in Japanese Patent Laid-Open Nos. 57-84771, 58-104666, 58-202075, and 60-238179, are known.

Although any of the above prior arts of the extrusion coating method can produce a uniform coating film thickness, the applicable good coating condition range is narrow and under the high-speed coating condition that low-viscosity liquid such as under-coating liquid for photographic materials is applied at a speed of several tens m/min or high-viscosity liquid such as magnetic coating liquid for magnetic recording media is applied at a speed of several hundreds m/min, it is very difficult to coat thin film stably.

At the time of high-speed thin film coating mentioned above, faults such as streaks in the longitudinal direction or cross lines in the transverse direction are generated very frequently.

In view of the above problem, the inventor has devoted himself to study and found that to realize stable high-speed thin film coating, it is necessary to increase the force for applying coating liquid onto the surface of the supporter and to increase the force, it is necessary to increase pressure (generation pressure) which is generated by the above coating liquid between the back edge surface and the coating object, for example, the surface of the supporter when the coating liquid passes the back edge surface and the present invention has been achieved.

SUMMARY OF THE INVENTION

The main object of the present invention is to provide a coater and coating method for allowing stable thin film coating at a high speed so as to increase the productivity.

The above object is accomplished, in an apparatus for applying coating liquid onto the coating object surface passing from the front edge portion or surface to the back edge surface by extruding out it continuously from the slit between the above front edge and back edge, by allowing the projection length L of the contour of the back edge portion or surface to the coating object in the slit direction, the distance h from the start edge of the back edge portion or surface to the coating object surface, and the distance ho from the end edge of the back edge portion or surface to the coating object surface to satisfy the following Formulas (X) and (Y).

$$L \geqq 1.0 \text{ mm} \qquad (X)$$

$$1.8 \leqq h/h_0 \leqq 3 \qquad (Y)$$

The idea of the present invention is to allow thin film coating at a high speed by almost maximizing the generation pressure when coating liquid passes the back edge surface.

From various experiments, analyses, and study of the shape of the back edge, the inventor has confirmed that the embodiment indicated below is most effective in high speed processing, though it slightly varies with the coating speed, liquid viscosity, and coating thickness.

According to the present invention, as shown in FIG. 1, it is assumed that when the projection length of the contour of the back edge surface to a supporter 9 in the direction of a slit 3 is taken as L, and the distance from a start edge A of a back edge surface 2 to the surface of the supporter 9 is taken as h, and the distance from an end edge B to the surface of the supporter 9 is taken as $h_0$, they satisfy the following Formulas (X) and (Y).

$$L \geqq 1.0 \text{ mm} \qquad (X)$$

$$1.8 \leqq h/h_0 \leqq 3 \qquad (Y)$$

As a result, continuously wedge-shaped convergent flow is generated during coating and the aforementioned generation pressure can be increased, so that faults such as streaks in the longitudinal direction or cross lines in the transverse direction can be prevented even at the time of high-speed thin film coating such as 300 m/min for magnetic coating liquid or 100 m/min for under-coating liquid and stable coating can be performed so as to increase the productivity.

DETAILED DESCRIPTION OF THE PREFERRED EMBODIMENTS

Next, the present invention will be explained more concretely using the embodiments shown in the accompanying drawings.

Figure 2:
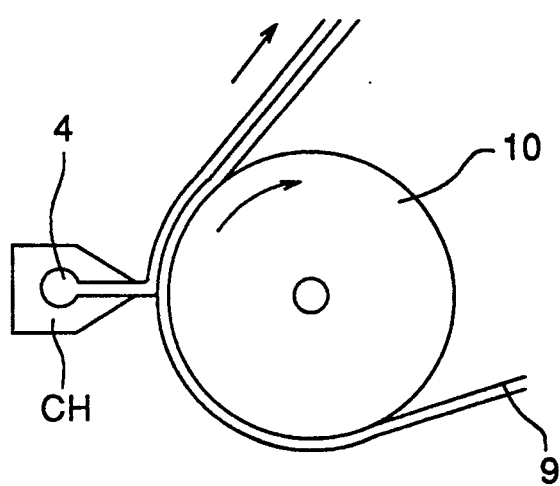
FIG. 2 is a schematic view of the coater for executing the present invention.

FIG. 2 shows a most suitable example when the present invention is applied. Coating liquid, for example, photographic coating liquid is extruded and applied to a supporter 9 passing on a backup roll 10 from an extrusion coater head CH.

Figure 1:
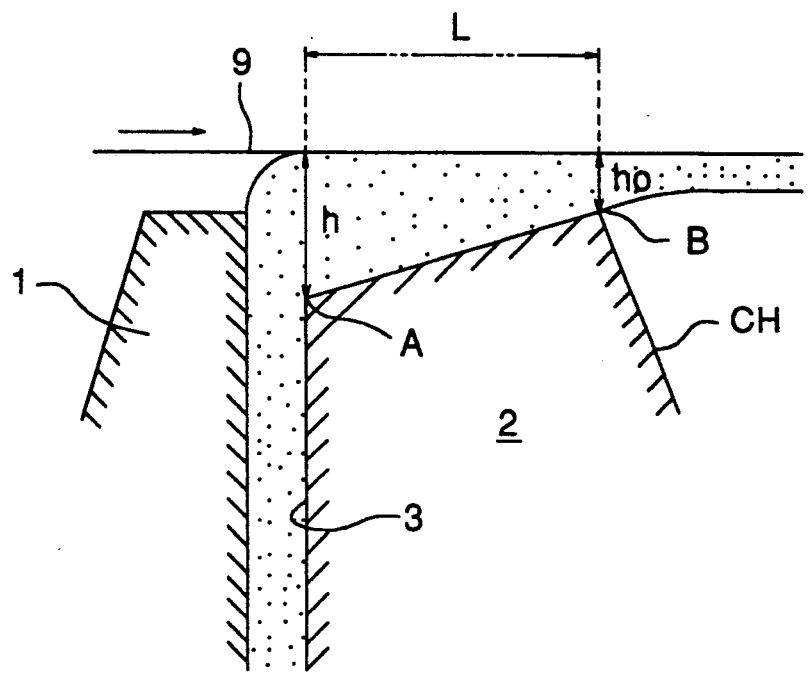
FIG. 1 is an enlarged sectional view of the essential section of the coater of the present invention.

The extrusion coater head CH has, as shown in FIG. 1, a front edge surface 1 on the upstream surface, a back edge surface.

2 on the downstream surface, a coating liquid pocket 4 (shown in FIG. 2) between them, and a slit 3 connected to the pocket 4.

Coating liquid is pumped to the pocket 4 by a pump which is not shown in the drawing and applied onto the surface of the supporter 9 via the slit 3.

According to the present invention, it is assumed that when the projection length of the contour of the back edge surface to the supporter 9 in the direction of the slit 3 is taken as L, and the distance from the start edge A of the back edge surface 2 to the surface of the supporter 9 is taken as h, and the distance from the end edge B to the surface of the supporter 9 is taken as $h_0$, they satisfy the following Formulas (X) and (Y).

$$L \geq 1.0 \text{ mm} \quad (X)$$

$$1.8 \leq h/h_0 \leq 3 \quad (Y)$$

These conditions intend to generate continuous wedge-shaped convergent flow for increasing the generation pressure so as to allow stable thin film coating at a high speed as mentioned above.

The linear distance L of the surface of the supporter 9 between the start edge A and the end edge B of the back edge surface 2 is generally set to at least 1.0 mm. However, as the viscosity of coating liquid increases or the coating speed increases, it is desirable to make the distance L longer. A distance of 10 mm is generally suitable, though the upper limit of the distance L is 30 mm. Although it is desirable to make the distance L longer so as to increase the pressure generated within the gap as the viscosity of coating liquid increases or the coating speed increases, any distance under the above upper limit is generally long enough.

As to the relationship between the distance h from the start edge A of the back edge surface 2 to the surface of the supporter 9 and the distance $h_0$ from the end edge B to the surface of the supporter 9, $1.8 \leq h/h_0 \leq 3$ is generally set. However, it is desirable to set it to $2.2 \leq h/h_0 \leq 2.6$ and more desirable to set it to $h/h_0 = 2.42$.

When $h/h_0$ is less than 1.8 or more than 3.0, the generation pressure when coating liquid passes the back edge surface does not increase, so that coating faults such as streaks in the longitudinal direction, miscoating, cross lines in the transverse direction, or pin holes are generated and no uniform coating film can be obtained.

Although the physical properties of coating liquid are not limited to a specific coating liquid in the present invention, coating liquid with an apparent viscosity of 0.5 to 10000 cp which is measured by a B-type viscometer can be used in the invention. Most coating liquid with high viscosity is thixotropic and the viscosity thereof is likely to decrease when strong shearing force is applied. For example, when coating liquid passes through a narrow gap such as h or $h_0$, shear rate of about $10^2$ to $10^6$ sec$^{-1}$ is applied to it and viscosity of, for example, 10000 cp may be reduced to 100 cp. Also from this point of view, the viscosity of object coating liquid cannot be limited.

The suitable ranges of $h/h_0$ and the distance L which correlate with the viscosity (apparent viscosity) of coating liquid are as follows:

(1) When the viscosity of coating liquid ranges from several cp to several tens cp L=1 to 3 mm $h/h_0$=1.8 to 3.0

(2) When the viscosity of coating liquid ranges from several hundreds cp to 10000 cp L=5 to 20 mm $h/h_0$=2.2 to 2.6

The magnitude of $h_0$ is proportional to the coating thickness. The suitable practical range is 20 to 2000 μm.

Figure 3:
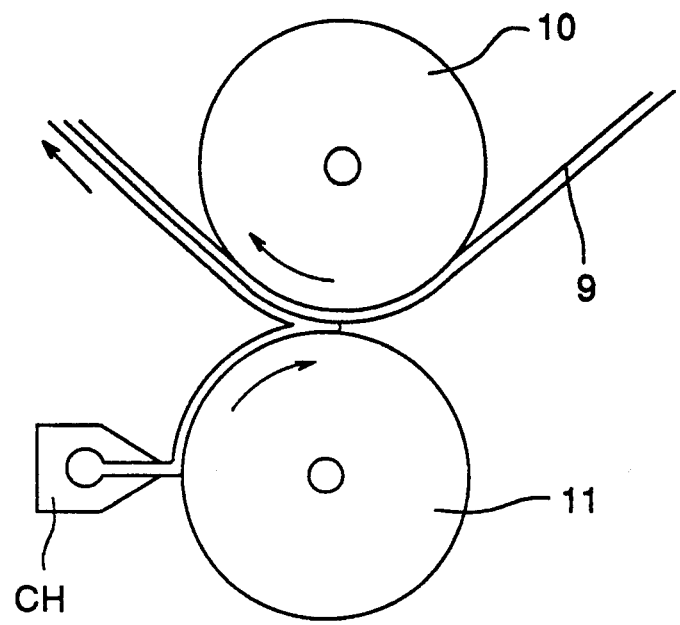
FIG. 3 is a schematic view of the coater for executing the present invention.
Figure 4:
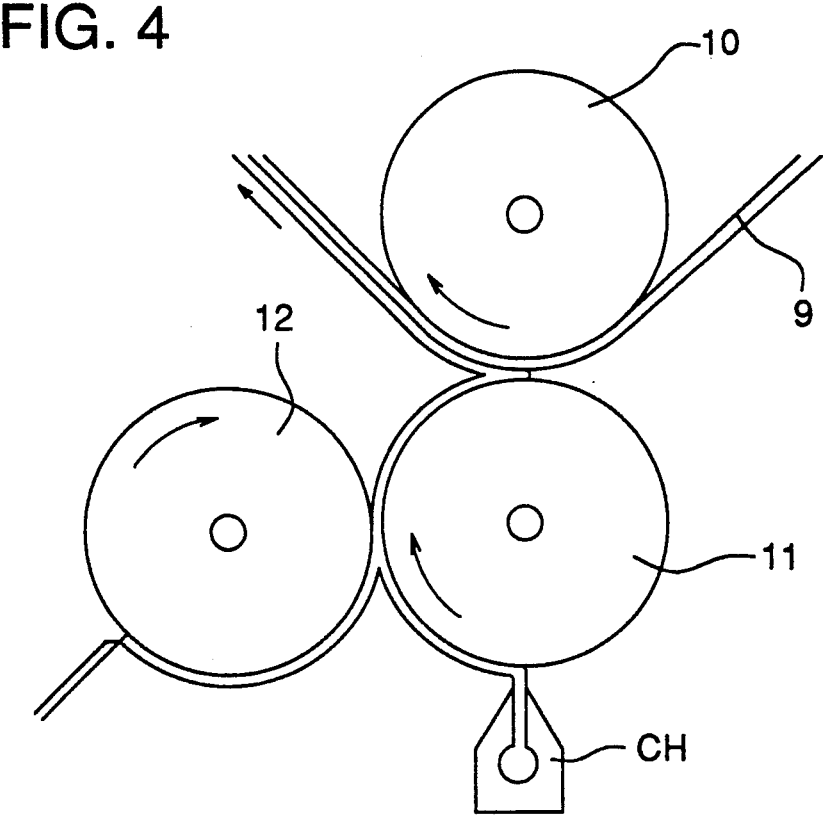
FIG. 4 is a schematic view of the coater for executing the present invention.

Furthermore, according to the present invention, as shown in FIG. 3, it is possible to extrude and apply coating liquid onto the supporter 9 passing on the backup roll 10 by a coating roll 11. Furthermore, as shown in FIG. 4, surplus coating liquid may be scraped off by a metering roll 12 and a scraping blade.

Figure 5:
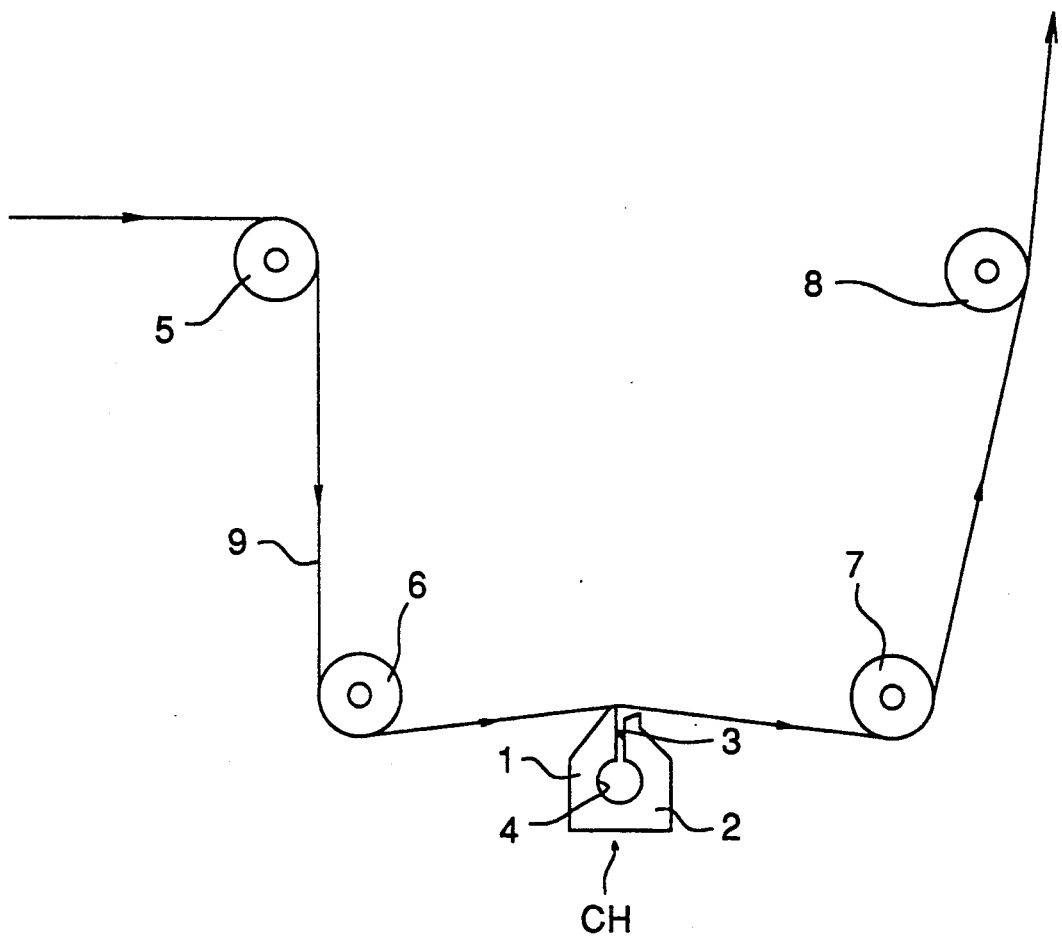
FIG. 5 is a schematic view of the coater for executing the present invention.

On the other hand, the processing shown in FIG. 5 may be performed. In a system that a supporter 9 moves forward along a front edge surface 1 and a back edge surface 2 via an upstream guide roll 5 and an upstream support roll 6 and then is lead to the subsequent process, for example, the drying process via a downstream guide roll 7 and a downstream support roll 8, coating liquid is applied onto the surface of the supporter 9 from an extrusion coater head CH between the support rolls 6 and 8.

As a supporter relating to the present invention, plastic film such as polyester film, paper, laminated sheets of the may be used if it is flexible. Embodiments Next, the effect of the present invention will be explained by showing embodiments.

Embodiment 1 using coating liquid with low viscosity

[1] Under-coating liquid with viscosity of 3 cp for a photographic material is applied onto a polyethylene terephthalate web with a width of 300 mm and a thickness of 100 μm at a coating speed of 100 m/min so as to form a wet coating film with a thickness of 10 μm.

By a conventional coater with $h/h_0$=1.0 and L=1.0 mm, parts where no coating liquid is applied or parts where the coating thickness is extremely thin occur in the transverse direction and uniform coating film cannot be obtained.

According to the present invention, when coating liquid is applied by a coater with a distance ratio ($h/h_0$) of 2.0 and L=1.0 mm, uniform and stable coating film can be formed overall in the transverse direction.

[2] Emulsion coating liquid with viscosity of 28 cp for a photographic material is applied onto an under-coated polyethylene terephthalate web with a width of 300 mm and a thickness of 100 μm at a coating speed of 120 m/min so as to form a wet coating film with a thickness of 40 μm.

By a conventional coater with $h/h_0$=1.0 and L=2.0 m/m, 3 or 4 streaks are generated in the longitudinal direction in each square meter area and also cross lines are generated in the transverse direction and uniform coating layer cannot be obtained.

According to the present invention, when coating liquid is applied by a coater with a distance ratio ($h/h_0$) of 2.42 and $L=2.0$ mm, uniform coating layer free of streaks in the longitudinal and transverse directions can be obtained.

Embodiment 2 using coating liquid with high viscosity

Magnetic coating liquid for video tape with viscosity of 1800 cp is applied onto a polyethylene terephthalate web with a width of 300 mm and a thickness of 14 $\mu$m at a coating speed of 300 m/min so as to form a wet coating film with a thickness of 20 $\mu$m.

By a conventional coater with $h/h_0=1.0$ and $L=10$ mm, cross lines are generated in the transverse direction and numberless pin holes like fine bubbles are also generated and uniform coating layer cannot be obtained.

According to the present invention, when coating liquid is applied by a coater with a distance ratio ($h/h_0$) of 2.42 and $L=10$ mm, uniform coating layer free of cross lines in the transverse direction and pin holes can be obtained.

As mentioned above, according to the present invention, stable thin film coating can be performed at a high speed so as to increase the productivity.

What is claimed is:

1. A method of applying a coating liquid comprising with a coater onto a surface of a substrate which moves in a predetermined moving direction, which coater comprises
   a substrate support;
   a front edge portion positioned in close proximity to the substrate;
   a back edge portion disposed downstream of the front edge portion in the moving direction of the substrate and arranged to be opposite to the surface of the substrate, thereby forming a gap therebetween;
   the front edge portion and the back edge portion forming a slit therebetween in a direction perpendicular to the moving direction of the substrate, wherein the coating liquid is extruded through the slit onto the surface of the substrate, the back edge portion having an entrance edge from which the extruded coating liquid is introduced into the gap between the back edge portion and the surface of the substrate and an exit edge from which the extruded coating liquid leaves the gap with the movement of the substrate; and
   the back edge portion satisfying the following two formulas:

$L = 1$ to 3 mm $h/h_0 = 1.8$ to 3.0 wherein
   L is a length of a contour of the back edge portion projected on the surface of the substrate between the entrance edge and the exit edge;
   h is a gap distance at the entrance edge between the back edge portion and the surface of the substrate; and
   $h_0$ is a gap distance at the exit edge between the back edge portion and the surface of the substrate;

the method comprising
   applying the coating liquid onto the surface of the substrate using said coater while forming a stream of the coating liquid between the surface of the substrate and the tapered back edge surface, said stream being in contact with said surface.

2. An apparatus for applying a coating liquid onto a surface of a substrate which moves in a predetermined moving direction, comprising:
   a front edge portion positioned in close proximity to the substrate;
   a substrate support;
   a back edge portion disposed downstream of the front edge portion in the moving direction of the substrate and arranged to be opposite to the surface of the substrate with a gap;
   the front edge portion and the back edge portion forming a slit therebetween in a direction perpendicular to the moving direction of the substrate, wherein the coating liquid is extruded through the slit onto the surface of the substrate, the back edge portion having an entrance edge from which the extruded coating liquid is introduced into the gap between the back edge portion and the surface of the substrate and an exit edge form which the extruded coating liquid leaves the gap with the movement of the substrate; and
   the back edge portion of said apparatus adapted to satisfy the following two formulas:

$1.0 \text{ mm} \leq L \leq 30 \text{ mm}$ $1.8 \leq h/h_0 \leq 3$ wherein
   L is a length of a contour of the back edge portion projected on the surface of the substrate between the entrance edge and the exit edge;
   h is a gap distance at the entrance edge between the back edge portion and the surface of the substrate; and
   $h_0$ is a gap distance at the exit edge between the back edge portion and the surface of the substrate.

3. The apparatus of claim 2, wherein the back edge surface is a tapered flat portion.

4. The apparatus of claim 2, wherein the substrate is a web conveyed in the moving direction.

5. The apparatus of claim 2, wherein the substrate is a coating roller rotating in the moving direction.

6. The apparatus of claim 2, wherein the gap distance ratio $h/h_0$ satisfies the following relation:

$2.2 \leq h/h_0 \leq 2.6$

7. The apparatus of claim 6, wherein the gap distance ratio $h/h_0$ satisfies the following relation:

$h/h_0 \approx 2.42$

8. The apparatus of claim 2, wherein the projected length of the back edge portion satisfies the following relation:

$1.0 \text{ mm} \leq L \leq 10 \text{ mm}$

* * * * *